United States Patent Office 3,833,626
Patented Sept. 3, 1974

3,833,626
PROCESS FOR PREPARING PERFLUORINATED MONO- AND DICARBOXYLIC ACIDS
Armin Ferse and Wolfgang Koch, Dresden, Germany, assignors to VEB Chemiewerk Nunchritz, Nunchritz, Germany
No Drawing. Continuation-in-part of abandoned application Ser. No. 761,787, Sept. 23, 1968. This application Sept. 17, 1971, Ser. No. 181,622
Int. Cl. C07c 53/16, 51/16; B01j 1/10
U.S. Cl. 260—408
6 Claims

ABSTRACT OF THE DISCLOSURE

Process for preparing perfluorinated carboxylic acids, more particularly perfluorinated mono- and dicarboxylic acids and derivatives thereof, which comprises in a first stage degrading PTFE (polytetrafluoroethylene) or related perfluorinated polymers or copolymers by exposure to high-energy radiation at a dosage between $8 \cdot 10^8$ and $5 \cdot 10^{10}$ r. and at a temperature between about 10 and 95° C. until perfluorinated aliphatic hydrocarbons are formed in the form of viscous oils of a chain length of $C_4$ to $C_{20}$, and thereafter in a second stage subjecting the same to oxidation with a strong oxidant, thus obtaining perfluorinated aliphatic acids of the corresponding chain length.

---

This is a continuation-in-part of application Ser. No. 761,787, filed Sept. 23, 1968, of the same applicants, with the same title as the present application, now abandoned.

Perfluorinated carboxylic acids (Φ-carboxylic acids) are important wetting agents and valuable emulsifying agents which, among other uses, lend themselves for use in the polymerization of fluoropolymers, or which in the form of their derivatives, may find application in the textile industry. However, up to now their use was limited due to the difficulties encountered in their preparation and the high expenses incurred thereby.

Perfluorinated carboxylic acids are generally made today electrochemically according to a process developed by J. A. Simons. That process avoids the use of elementary fluorine and the use of compounds splitting off fluorine, such as $CoF_3$, $AgF_3$, $MnF_3$ and the like. Hydrogen-containing carboxylic acids are converted into perfluorinated carboxylic acids by electrolysis in anhydrous HF (J. A. Simons et al., Trans. Electrochem. Soc. 95 (1949) 46; U.S. Pats. 2,519,983 and 2,567,011; German Pat. 836,796).

The so-called electro-fluorination is very expensive since, on the one hand, it requires high installment costs, and on the other hand, the yields in carboxylic acids of higher chain length are so poor that carboxylic acids having a chain length of more than $C_{10}$ are practically not obtainable by that process.

Special perfluorinated carboxylic acids, likewise with a chain length below $C_{10}$, are also obtainable by oxidation of perfluorinated olefins with permanganate (T. J. Brice et al., J. Amer. Chem. Soc. 75 (1953) 2698–2702; R. N. Hazeldine, J. Chem. Soc. (London) (1952) 4259–68).

Other possibilities of preparation are hydrolysis of perfluoroiodoparaffins with oleum (German Pat. 1,211,-619) or hydrolysis of compounds with groups such as $—CCl_3$, $—CFCl_2$, or $—CFClBr$ in end positions (U.S. Pats. 2,806,865 and 2,806,866; German Patent Publication /AS/ 1,158,488).

In one of these cases the more or less fluorinated starting products have to be synthesized in equally expensive processes, e.g. telomerization, that is to say from monomeric halogenated hydrocarbons.

Process for preparing perfluorinated carboxylic acids having a chain length of more than $C_{10}$ are unknown up to now.

While studies have been made of the changes in the properties and derivatives of PTFE under radiation with low as well as high dosages of radiation, the problem of producing perfluorinated carboxylic acids by first degrading the PTFE and subjecting the thereby obtained degradation products to oxidation in order to prepare mono- and dicarboxylic perfluorinated acids of a chain length of $C_4$ to $C_{20}$ has not been investigated, as publications appearing in the literature up to now have shown.

Studies by Japanese scientists, Danno et al., reported in C.A., vol. 61, 1964, p. 7130g, relate to and describe radiation effects on high polymers, namely polyethylene, polyvinyl alcohol and PTFE. The authors are particularly interested in the effects brought about by gamma radiation as compared to irradiation in the atomic reactor. The significance of a special radiation range is not indicated and while several methods are described as to how the irradiated products were studied, there is no identification of a single break-down product by name or chain length.

To produce a mixture of well defined perfluorinated carboxylic acids from which, if desired, individual acids can be isolated, is neither described nor hinted at. That Danno et al. were not considering making perfluorinated carbocyclic acids from PTFE is also obvious from the fact that they discussed the irradiation of polyethylene, polyvinyl alcohol and PTFE quite indiscriminately, paying no attention to the possibilities of making special oxidation products from degradation products of PTFE obtained under well defined conditions of high radiation doses within a narrow range.

Investigations have also been made by Russian scientists Tsvetkov et al. on reactions of free radicals derived from irradiated Teflon, reported in C.A., vol. 56, 1962 and 54, 1960 (respective pages 8921g and 19132g). These investigations deal particularly with a study of the stability of break-down products, and it was found that radicals obtained by low irradiation doses lent themselves especially well to studies of stability in solid Teflon.

While the dose of irradiation is not directly mentioned in the Tsvetkov articles, it is deduced from their remarks that due to the sensitivity of the method for measurement of the particles, irradiation should be carried out at very low doses.

The Russian authors state: "Earlier investigations made in our laboratory have shown that PTFE (Teflon) is one of the most suitable substances for model tests for the purpose of intensive research on the chemical properties of radicals. By irradiation of PTFE stable fluoro-alkyl radicals are formed which will not recombine up to the melting temperature of PTFE, namely 320° C., but are reversibly oxidized in air and are converted into peroxide radicals."

The formation of peroxides is considered as a proof that carboxylic acids could not have been obtained in the oxidation reactions of Tsvetkov et al.

The studies of Tsvetkov et al. as well as Danno et al. were made for the purpose of establishing what changes are brought about in Teflon by irradiation, and what parameters are maintained in order to decide their usefulness in the construction of nuclear reactors. This purpose is, of course, entirely different from the present invention which aims at preparing valuable perfluorinated carboxylic acids.

Since, up to now, no practical and inexpensive method was available for preparing perfluorinated carboxylic acids from PTFE, it is an object of the present invention to provide such methods, which are free of the shortcomings of the existing methods and which make the preparation of said acids and their derivatives easily accessible for practical purposes.

It is a further object of the present invention to subject other perfluorinated polymers instead of PTFE to the treatment of the invention.

It is yet another object of the invention to utilize PTFE scraps, the use of which was hitherto uneconomical and cumbersome, especially when they are contaminated with metal chips or the like, and to render them serviceable for making high-grade perfluorinated carboxylic acids.

Other objects and advantages will be apparent from the following detailed description.

It has been found that perfluorinated carboxylic acids can be obtained advantageously by a two-stage oxidation of intensely irradiated perfluorinated polymers and copolymers. By radiation rich in energy, the polymers, e.g. PTFE are degraded, in a first stage, to pieces of shorter chain length, that is to say, that the polymer chain is broken down into pieces, having in general a chain length from $C_4$ to $C_{20}$, by treating the PTFE at temperatures ranging from 10 to 250° C., more particularly from 10 to 95° C., and at radiation doses between $8 \cdot 10^8$ and $5 \cdot 10^{10}$ R. (=$6.73 \cdot 10^8$ and $4.21 \cdot 10^{10}$ rad.), particularly $5 \cdot 10^9$ to $1 \cdot 10^{10}$ R. (=$4.21 \cdot 10^9$ to $8.41 \cdot 10^9$ rad.). By this radiation treatment, short-chain radicals are obtained in the form of viscous oils from the solid perfluorinated polymers in almost quantitative amounts. Only small amounts of gaseous products, from 2 to 8% by weight, are formed by the irradiation from the solid starting materials. Solid constituents are no longer present after the irradiation.

The liquid products obtained amount to about 95% by weight calculated on the solid perfluorinated polymers used as starting materials; the liquids are yellowish to brown viscous oils with viscosities ranging from 800 to 45, predominantly from 530 to 110 poises. The liquid oils consist of radical-like and unsaturated aliphatic perfluorinated compounds with chain lengths from $C_4$ to $C_{20}$. The chain length of the components of the viscous oils may be deduced from the carboxylic acids obtained therefrom, since by the above described two-stage preparation only the first stage results in chain degradation, the second stage in a saturation of the radicals or the unsaturated compounds, respectively.

The viscous oils are then subjected to a strong oxidant, for which operation there exist a number of known oxidizing agents well suited for the purpose, listed below.

The resulting product of the oxidation treatment is a mixture of mono- and dicarboxylic perfluorinated acids of low and high molecular weight following the law of statistics. The so obtained mixture may be used as such, or it may be separated e.g. by distillation or other known procedures into individual compounds to be used for further processing.

It was surprising to find that by absorption of a comparatively narrow range of radiation doses a viscous oil is derived from solid insoluble PTFE. The range of absorbed radiation is critical: when the radiation dose is very low, a brittle PTFE is obtained which is practically valueless. When the radiation is carried out too long, the obtained products are mostly gaseous. Only after absorption of the narrow radiation dose indicated above, the oily degradation products are obtained which can be converted by oxidation into the valuable perfluorinated acids.

The following types of radiation may be applied: Gamma rays, combined neutron and gamma rays, as they occur in nuclear reactors, beta rays and bombardment with rapid electrons, for instance when a Graaff generator is applied.

By "strong oxidants" we mean oxidizing agents such as aqueous potassium permanganate solution, or $KMnO_4$ dissolved in organic solvents, e.g. ketones or carboxylic acids. Other oxidants are ozone, chromates, peroxides, peroxydisulfate, lead tetraacetate, oxygen from the air, and oleum.

The temperature to be maintained during the oxidation step depends on the oxidant. With $KMnO_4$ in acetone, a temperature range of −40 to +60° C. is appropriate; with $KMnO_4$ or $(NH_4)_2S_2O_8$ in aqueous solution, oxidation may be carried out at temperatures between room temperature (about 20° C.) and boiling temperature (100° C.), also in an autoclave, under increased pressure.

The invention has several important advantages. It permits to avoid working with aggressive fluorine compounds. Moreover it makes it possible, for the first time, to prepare on a technical scale perfluorinated carboxylic acids with a chain length above $C_{10}$. It is another advantage that, according to the invention, scrap materials of perfluorinated polymers, which were hitherto useless, may be converted into valuable perfluorinated carboxylic acids.

The invention will now be more fully explained in a number of examples, but it should be understood that these are given by way of illustration and not of limitation and that many changes in the details can be made without departing from the spirit of the invention.

EXAMPLE 1

PTFE (polytetrafluoroethylene) was exposed to a mixed radiation with neutron and gamma rays at a temperature of 65° C. until the absorbed radiation dosis was about $8.5 \cdot 10^9$ rad. (equal to $1.01 \cdot 10^{10}$ r.). Obtained were 95% by weight of a viscous oil; viscosity 250 poises.

Oxidation of the viscous oil obtained in the above-described manner was carried out on 10 g. with 100 g. $KMnO_4$ in 250 g. water in a vibrating autoclave for 24 hours at a temperature of 105° C. The mixture was discolored with $SO_2$ and solidified with 50 ml. conc. $H_2SO_4$.

From the extract with ether which was then prepared, 2 g. of different perfluorinated carboxylic acids were isolated. By gas-chromatographic analysis the mixture was found to contain Φ-enanthic acid, -caprylic acid and -pelargic acid. For identifying some high-boiling homologs of the Φ-carboxylic acids, which are sure to be present, gas chromatography proved to be insufficient. Determination of molecular weight showed a mean chain length of the Φ-carboxylic acids to be $C_{11}$.

The neutralization equivalent and the course of the boiling-point curve proved that the mixture contained a considerable quantity of dicarboxylic acids.

EXAMPLE 2

PTFE was exposed to a mixed radiation with neutron and gamma rays at a temperature of 75° C. until the absorbed radiation dosis was about $8.5 \cdot 10^9$ rad. (equal to $1.01 \cdot 10^{10}$ r.). 95% by weight of viscous oil were obtained; viscosity 180 poises.

20 g. of the viscous oil were oxidized at 0° C. with $KMnO_4$ dissolved in acetone according to the amount consumed. After 48 hours the oxidation was complete.

From the reaction mixture 4.5 g. of different perfluorinated mono- and dicarboxylic acids were isolated. We were able to identify the following monocarboxylic acids: Φ-valeric acid, -caproic acid, -enanthic acid, -caprylic acid, -pelargic acid and -capric acid. Also identified were the following dicarboxylic acids: Φ-succinic acid, -glutaric acid, -adipic acid and -pimelic acid. The course of the boiling point curve indicated the presence of some higher homolog Φ-mono- and dicarboxylic acids.

EXAMPLE 3

PTFE was exposed to gamma radiation with a dosis of $2 \cdot 10^6$ r./h. for 5500 hours at room temperature; the absorbed radiation dosis was $9 \cdot 10^9$ rad. 90% by weight of viscous oil were obtained; viscosity 530 poises.

25 g. of the viscous oil formed were oxidized in a vibrating autoclave with 200 g. $KMnO_4$ in 600 g. $H_2O$ at 105° C. for 24 hours. The mixture was discolored with $SO_2$, acidified with 120 ml. conc. $H_2SO_4$ and extracted with ether.

Obtained were 5.5 g. perfluorinated mono- and dicarboxylic acids. We were able to isolate the homolog Φ-monocarboxylic acids $C_4$ to $C_{10}$, and the homolog Φ-dicarboxylic acids $C_4$ to $C_8$. In addition, some higher molecular perfluorinated mono- and dicarboxylic acids were formed, which would not be isolated, but could be detected by the course of the boiling-point curve.

EXAMPLE 4

PTFE was exposed in a pressure tank to a bombardment with rapid electrons from a Van-de-Graaff generator. The current density was at 0.8 μa./cm.$^2$, the electron energy at 1.5 mev. The dosis effect was $6 \cdot 10^8$ r./h. The temperature of the material during the bombardment was 95° C. After absorption of $8.2 \cdot 10^9$ rad. (equal to $9.75 \cdot 10^9$ r.) a viscous oil was obtained in an amount of 98% by weight; viscosity 310 poises. Of this oil, 25 g. were oxidized. Oxidation and further processing occurred as in Example 3.

The total amount of Φ-mono- and dicarboxylic acids was 5.5 g. From the mixture we isolated and identified Φ-butyric acid, -valeric acid, -caproic acid, -enanthic acid, -caprylic acid, -pelargic acid; -capric acid, -succinic acid, -glutaric acid, -adipic acid and -pimelic acid.

In addition to these acids, some higher Φ-mono- and dicarboxylic acids were formed as evidenced by the course of the boiling-point curve.

EXAMPLE 5

PTFE was exposed to irradiation with rapid electrons in a pressure-tank Van-de-Graaff generator. The current density of the electrons was at $10^{-6}$ a./cm.$^2$, the electron energy at 1.5 mev. The effect of the dose was $8 \cdot 10^8$ r./h., the temperature of the irradiated material during radiation 220° C. 20 g. of the viscous oil obtained after absorption of $8.4 \cdot 10^8$ rad. (equal to $1 \cdot 10^9$ r.), which amounted to 96% by weight of the used PTFE and had a viscosity of 110 poises, were oxidized as described in Example 3 and processed.

We obtained a total amount of 4.5 g. perfluorinated mono- and dicarboxylic acids. From the mixture the following acids were isolated and identified: (a) Φ-butyric acid, -valeric acid, -caproic acid, -enanthic acid, -caprylic acid, -pelargic acid; (b) Φ-capric acid, -succinic acid, -glutaric acid, -pimelic acid.

In addition to these acids, also higher perfluorinated mono- and dicarboxylic acids were formed as could be seen from the course of the boiling-point curve.

EXAMPLE 6

A copolymer of tetrafluoroethylene and hexafluoropropylene, which contained 12 mol percent of the latter, was exposed to a mixed neutron and gamma irradiation at 75° C. until the absorbed radiation dose was $5 \cdot 10^9$ rad. (equal to $5.95 \cdot 10^9$ r.). 20 g. of the obtained viscous oil (97% by weight of used copolymer, and having a viscosity of 270 poises) were oxidized in acetone at 8° C. with $KMnO_4$ for 48 hours.

From the reaction mixture we were able to obtain 4.8 g. of several perfluorinated mono- and dicarboxylic acids, which partly contained trifluoromethyl side chains. Positively identified and isolated were: (a) β-trifluoromethyl-Φ-caproic acid, -enanthic acid, -caprylic acid; (b) γ-trifluoromethyl-Φ-caprylic acid; (c) β- and γ-trifluoromethyl-Φ-pelargic acid, -capric acid; (d) Φ-butyric acid, -valeric acid, -caproic acid, -enanthic acid, -caprylic acid, -pelargic acid; (e) Φ-capric acid, -succinic acid, -glutaric acid, -adipic acid, -pimelic acid.

In addition to these acids, also higher perfluorinated mono- and dicarboxylic acids were formed as could be seen from the course of the boiling-point curve.

In the foregoing examples, PTFE was exposed to radiation in the form in which it came from production, after a shaping operation. However, it should be noted that from coarse blanks obtained by pressing or other shaping processes, large amounts of waste are obtained when the blanks are operated on by cutting. These cut chips cannot be melted down, and put to further use, as it is done with other plastic materials, because of the specific properties of PTFE. Chemically, however, the chips are pure PTFE and of equal value as the uncompressed PTFE powder.

It should, therefore, be understood that the above examples are equally well applicable to PTFE chips as to shaped products of PTFE in bulk.

It should be understood, of course, that the foregoing disclosure relates only to preferred embodiments of the invention and that it is intended to cover all changes and modifications of the examples described which do not constitute departures from the spirit and scope of the invention.

What we claim is:

1. A process for preparing perfluorinated mono- and dicarboxylic acids, which comprises in a first stage degrading PTFE (polytetrafluoroethylene) or a copolymer of tetrafluoroethylene and hexafluoropropylene by exposure to high-energy radiation at a dosage between $8 \cdot 10^8$ and $5 \cdot 10^{10}$ r. and at a temperature between about 10 and 95° C. until perfluorinated aliphatic hydrocarbons are formed in the form of viscous oils of a chain length of $C_4$ to $C_{20}$, and thereafter in a second stage subjecting the same to oxidation with a strong oxidant, thus obtaining perfluorinated aliphatic acids of the corresponding chain length.

2. The process as defined in claim 1, wherein polytetrafluoroethylene is subjected to radiation doses ranging from $5 \cdot 10^9$ to $1 \cdot 10^{10}$ r. and temperatures ranging from 20 to 80° C., whereby viscous oils are obtained having viscosities from 45 to 800 poises, said oils being then subjected to the second-stage oxidation.

3. The process as defined in claim 2, wherein the oils obtained have viscosities ranging from 110 to 530 poises.

4. The process as defined in claim 1, wherein a copolymer of tetrafluoroethylene and hexafluoropropylene, with 12% by weight of the latter, is subjected at about 75° C. to high-energy radiation until the absorbed dose is $5.95 \cdot 10^9$ r., whereby a viscous oil with the viscosity of 270 poises is obtained which is then subjected to the second-stage oxidation.

5. The process as defined in claim 1, wherein the second-stage oxidation is carried out for several hours in the presence of a strong oxidant selected from the group consisting of $KMnO_4$, $(NH_4)_2S_2O_8$, ozone, chromates, peroxides, peroxydisulfates, lead tetraacetate, oxygen and oleum, at temperatures from 40° C. to 120° C.

6. The process as defined in claim 1, wherein chips of polytetrafluoroethylene or a copolymer of tetrafluoroethylene and hexafluoropropylene, resulting from a cutting operation performed on coarse material, are subjected to high-energy radiation and subsequent oxidation treatment.

References Cited

UNITED STATES PATENTS

| | | | |
|---|---|---|---|
| 2,903,467 | 9/1959 | Fischer | 260—408 |
| 2,950,300 | 8/1960 | Brandon | 260—408 |
| 2,806,866 | 9/1957 | Barnhart et al. | 260—408 |
| 2,842,524 | 7/1958 | Herbst et al. | 260—77.5 |

OTHER REFERENCES

Chemical Abstracts, vol. 54, 19123f (1960).
Chemical Abstracts, vol. 54, 22370c (1960).
Chemical Abstracts, vol. 56, 8921g (1962).
Chemical Abstracts, vol. 61, 7130g (1964).
Chemical Abstracts, 7th Collective Index, Subject Index, p. 89235.

LEWIS GOTTS, Primary Examiner

D. G. RIVERS, Assistant Examiner

U.S. Cl. X.R.

260—537 S, 537 P, 539; 204—158 HE